United States Patent [19]
Smith et al.

[11] Patent Number: 5,996,274
[45] Date of Patent: Dec. 7, 1999

[54] RODENT TRAP

[76] Inventors: Larry E. Smith; Jeanette Smith, both of 151 Tresane St., Oshawa, Ontario L1J I17, Canada

[21] Appl. No.: 09/048,268

[22] Filed: Mar. 26, 1998

[51] Int. Cl.[6] .................................................. A01M 23/10
[52] U.S. Cl. .................................... 43/71; 43/64; 43/69
[58] Field of Search ................................. 43/58, 60, 61, 43/64, 65, 68, 69, 71, 73; 193/35 R, 37

[56] References Cited

U.S. PATENT DOCUMENTS

| | | | |
|---|---|---|---|
| D. 323,016 | 1/1992 | Vajs | D22/119 |
| 1,111,474 | 9/1914 | Lenfestey | 193/37 |
| 1,580,367 | 4/1926 | Beulke | 193/37 |
| 2,584,498 | 2/1952 | Posey | 43/69 |
| 2,619,765 | 12/1952 | Sees | 43/64 |
| 2,757,988 | 8/1956 | Lecourbe | 193/37 |
| 2,886,156 | 5/1959 | Halbron | 193/37 |
| 3,423,870 | 1/1969 | Kost | 43/69 |
| 3,528,191 | 9/1970 | Hand | 43/64 |
| 3,599,769 | 8/1971 | Gardella | 193/37 |
| 3,610,387 | 10/1971 | Vom Stein | 193/37 |
| 3,915,275 | 10/1975 | Specht | 193/37 |
| 4,059,180 | 11/1977 | Krivec et al. | 193/37 |
| 4,154,016 | 5/1979 | Reyes | 43/69 |
| 4,311,226 | 1/1982 | Thompson et al. | 193/37 |
| 4,315,566 | 2/1982 | Greener et al. | 193/37 |
| 4,668,110 | 5/1987 | Egeto et al. | 193/37 |
| 4,706,408 | 11/1987 | Mellard | 43/69 |
| 4,793,459 | 12/1988 | Forknall et al. | 193/37 |
| 4,852,230 | 8/1989 | Yu | 193/37 |
| 4,854,887 | 8/1989 | Snyder | 43/71 |
| 4,876,821 | 10/1989 | Benzie | 43/69 |
| 4,879,836 | 11/1989 | Dolyny | 43/64 |
| 4,955,462 | 9/1990 | Bilodeau et al. | 193/37 |
| 5,406,741 | 4/1995 | Little et al. | 43/65 |
| 5,433,308 | 7/1995 | Gagnon | 193/37 |
| 5,517,784 | 5/1996 | Sedore | 43/69 |
| 5,528,852 | 6/1996 | Sarff | 43/71 |
| 5,579,601 | 12/1996 | Norrad | 43/64 |
| 5,720,126 | 2/1998 | Lamb | 43/69 |
| 5,728,034 | 3/1998 | Robin et al. | 43/71 |
| 5,865,290 | 2/1999 | Scott | 193/37 |

*Primary Examiner*—Michael J. Carone
*Assistant Examiner*—Darren Ark

[57] ABSTRACT

A rodent trap for drowning a plurality of rodents and other small pests without the need for resetting the trap is disclosed. The inventive device includes a ramp engageable to a rim of a conventional pail and a rotating body positionable horizontally within the pail. The pail is partially filled with water or a mixture of water and ethylene glycol in such manner that the rotating body is free to rotate a distance above the water or mixture line. The rotating body includes a cylindrical body rotatably mounted to a shaft in such manner that a rodent or like pest is unable to feed upon a rodent-attracting substance such as peanut butter spread on the cylindrical body without stepping upon the cylindrical body and thereby causing the cylindrical body to rotate and force the rodent or like pest into the water or mixture of water and ethylene glycol.

9 Claims, 1 Drawing Sheet

RODENT TRAP

BACKGROUND OF THE INVENTION

1. Field of the Invention

The present invention relates to animal traps and more particularly pertains to a new rodent trap for drowning a plurality of rodents and other small pests without the need for resetting the trap.

2. Description of the Prior Art

The use of animal traps is known in the prior art. More specifically, animal traps heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal traps include U.S. Pat. Nos. 3,423,870; 4,706,408; 4,154,016; 4,879,836; 2,584,498 and U.S. Des. Pat. No. 323,016.

While these devices fulfill their respective, particular objectives and requirements, the aforementioned patents do not disclose a new rodent trap. The inventive device includes a ramp engageable to a rim of a conventional pail and a rotating body positionable horizontally within the pail. The pail is partially filled with water or a mixture of water and ethylene glycol in such manner that the rotating body is free to rotate a distance above the water or mixture line. The rotating body includes a cylindrical body rotatably mounted to a shaft in such manner that a rodent or like pest is unable to feed upon a rodent-attracting substance such as peanut butter spread on the cylindrical body without stepping upon the cylindrical body and thereby causing the cylindrical body to rotate and force the rodent or like pest into the water or mixture of water and ethylene glycol.

In these respects, the rodent trap according to the present invention substantially departs from the conventional concepts and designs of the prior art, and in so doing provides an apparatus primarily developed for the purpose of drowning a plurality of rodents and other small pests without the need for resetting the trap.

SUMMARY OF THE INVENTION

In view of the foregoing disadvantages inherent in the known types of animal traps now present in the prior art, the present invention provides a new rodent trap construction wherein the same can be utilized for drowning a plurality of rodents and other small pests without the need for resetting the trap.

The general purpose of the present invention, which will be described subsequently in greater detail, is to provide a new rodent trap apparatus and method which has many of the advantages of the animal traps mentioned heretofore and many novel features that result in a new rodent trap which is not anticipated, rendered obvious, suggested, or even implied by any of the prior art animal traps, either alone or in any combination thereof.

To attain this, the present invention generally comprises a ramp engageable to a rim of a conventional pail and a rotating body positionable horizontally within the pail.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rodent trap apparatus and method which has many of the advantages of the animal traps mentioned heretofore and many novel features that result in a new rodent trap which is not anticipated, rendered obvious, suggested, or even implied by any of the prior art animal traps, either alone or in any combination thereof.

It is another object of the present invention to provide a new rodent trap which may be easily and efficiently manufactured and marketed.

It is a further object of the present invention to provide a new rodent trap which is of a durable and reliable construction.

An even further object of the present invention is to provide a new rodent trap which is susceptible of a low cost of manufacture with regard to both materials and labor, and which accordingly is then susceptible of low prices of sale to the consuming public, thereby making such rodent trap economically available to the buying public.

Still yet another object of the present invention is to provide a new rodent trap which provides in the apparatuses and methods of the prior art some of the advantages thereof, while simultaneously overcoming some of the disadvantages normally associated therewith.

Still another object of the present invention is to provide a new rodent trap for drowning a plurality of rodents and other small pests without the need for resetting the trap.

Yet another object of the present invention is to provide a new rodent trap which includes a ramp engageable to a rim of a conventional pail and a rotating body positionable horizontally within the pail.

Still yet another object of the present invention is to provide a new rodent trap that is effective regardless of the temperature of the environment where the trap is used.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
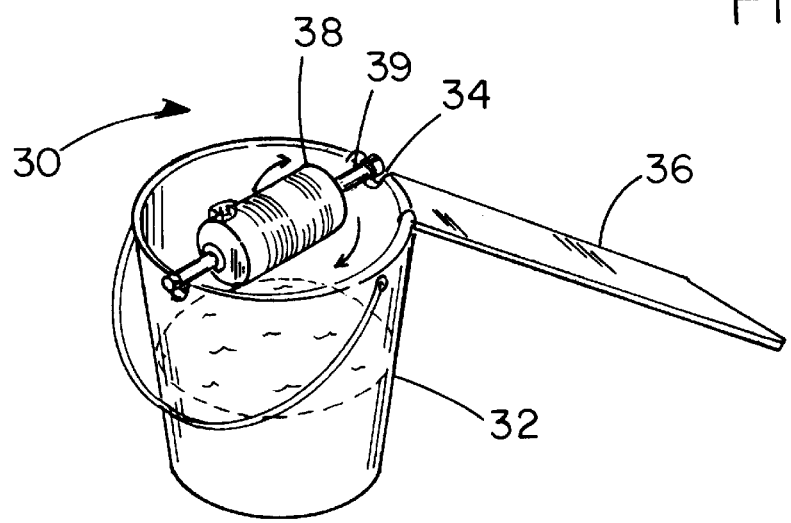
FIG. 1 is a right side perspective view of a new rodent trap according to the present invention.
Figure 2:
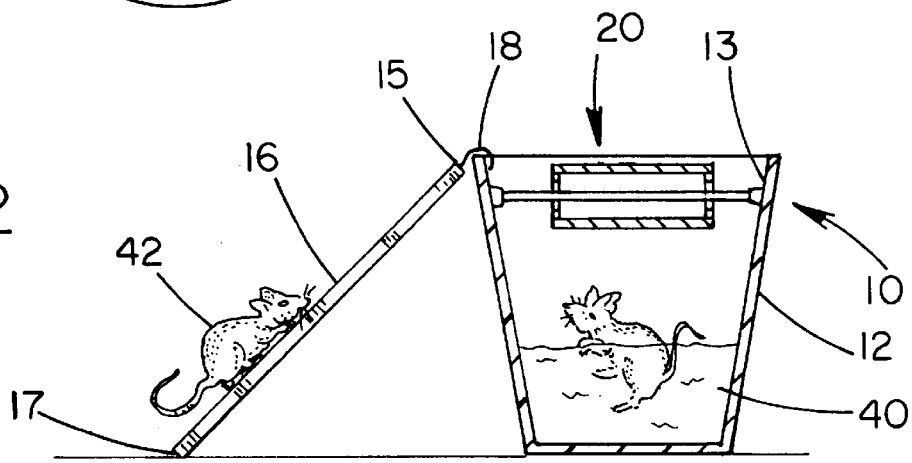
FIG. 2 is a cross sectional view of an alternative embodiment of the present invention.
Figure 3:
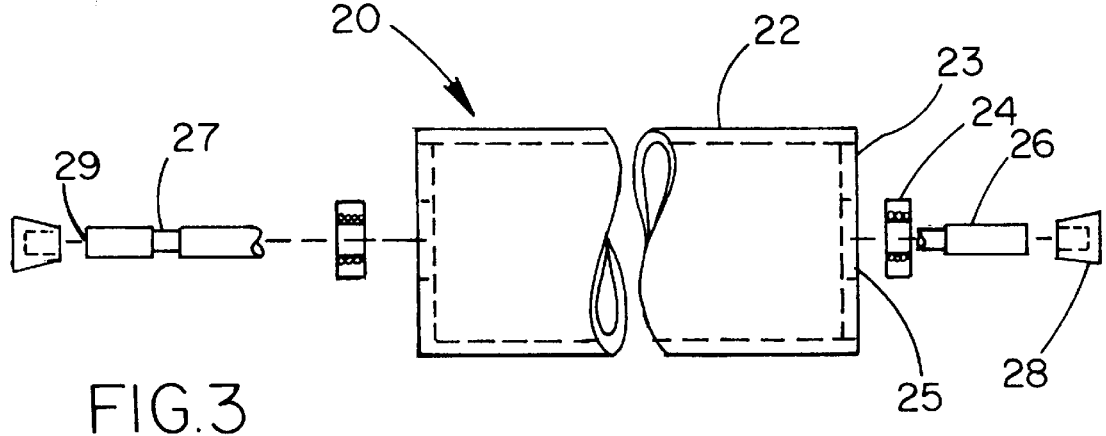
FIG. 3 is an exploded isometric illustration of the rotating body of FIG. 2.

With reference now to the drawings, and in particular to FIGS. 1 through 3 thereof, a new rodent trap embodying the principles and concepts of the present invention and generally designated by the reference numeral 10 will be described.

More specifically, it will be noted that the rodent trap 10 comprises a ramp 16 engageable to the rim of a pail 12. The ramp 16 is shown including a first end 15 and a second end 17. The second end 17 is designed to rest upon a surface outside the pail 12 such as a floor or table top. The first end 15 further includes a means for engaging the rim of the pail 12 such as a hooked member 18.

A rotating body 20 is shown in FIGS. 2 and 3 including a cylindrical body 22 rotatably mounted to a shaft 26. The shaft 26 includes ends 29 to which are shown engaged boots 28 which in the preferred embodiment are made of rubber or similar material. A pair of spaced recesses 27 are shown for fixedly receiving a pair of bearings 24 which are closely received in a pair of apertures 25 formed in the end portions 23 of the cylindrical body 22.

In use the rotating body 20 is positioned horizontally inside a pail 12 partially filled with a liquid 40 which may be either water or a mixture of water and ethylene glycol, if the ambient temperature is below the freezing point of water. The boots 28 are frictionally positioned on the inside surface 13 of the pail 12 to retain the rotating body 20 in a position above the water or mixture line. The ramp 16 is engaged to the rim of the pail 12 by means of hooked member 18 in such manner that a rodent 42 or like pest must leap to the cylindrical body 22 in order to get to a rodent attracting substance such as peanut butter which is spread upon the cylindrical body 22. Once the rodent or like pest lands upon the cylindrical body 22, the cylindrical body 22 rotates about the shaft 26 causing the rodent or like pest to fall into the water or mixture and drown. With a sufficiently large pail a plurality of rodents and like pests can be caught and disposed of in this manner.

With reference to FIG. 1 there is shown an alternative embodiment 30 of the present invention including a ramp 36 shown engaged to the rim of a pail 32. A rotating body 38 is fixedly attached to a shaft 39 which rotates in a pair of slots 34 formed in the rim of the pail 32. In use the alternative embodiment 30 operates in similar manner to the rodent trap 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rodent trap for use with a pail having a rim and an inside surface comprising:

a ramp engageable to the rim of the pail;

a rotating body positionable horizontally and entirely within the pail;

the rotating body having a cylindrical body rotatably mounted to a shaft, the shaft being fixedly positionable within the pail and having opposite ends, each of said opposite ends receiving a boot frictionally engageable to the inside surface of the pail; and wherein said boots each have an outer surface which lies in a plane perpendicular to an axis of the shaft, such that when the rotating body is placed within the pail, the outer surfaces each engage the inside surface of the pail in face to face contacting relation.

2. The rodent trap of claim 1, wherein the cylindrical body further comprises a pair of bearings, the bearings being closely receivable in apertures disposed at opposite ends of the cylindrical body, the bearings being fixedly attachable to the shaft.

3. The rodent trap of claim 2, wherein the shaft further comprises a pair of spaced recesses formed thereon for receiving the bearings.

4. The rodent trap of claim 1, wherein the boots are formed of rubber.

5. The rodent trap of claim 1, wherein the pail is fillable with water and wherein the rotating body is positionable a distance above the level of the water.

6. The rodent trap of claim 1, wherein the pail is fillable with a mixture of water and ethylene glycol and wherein the rotating body is positionable a distance above the level of the mixture.

7. The rodent trap of claim 1, wherein the cylindrical body is centeredly positioned on the shaft.

8. The rodent trap of claim 1, wherein the ramp further comprises a first end and a second end, the second end being for resting upon a surface outside of the pail and the first end further comprising a means for engaging the rim of the pail.

9. A rodent trap for use with a pail having a rim and an inside surface comprising:
- a ramp engageable to the rim of the pail, the ramp having a first end and a second end, the second end being for resting upon a surface outside of the pail and the first end further comprising a means for engaging the rim of the pail;
- a rotating body positionable horizontally and entirely within the pail, the rotating body having a cylindrical body rotatably mounted to a shaft, the shaft being fixedly positionable within the pail and having opposite ends, each of said opposite ends receiving a rubber boot frictionally engageable to the inside surface of the pail, the shaft further comprising a pair of spaced recesses formed thereon, each recess fixedly receiving a bearing, each bearing being closely receivable within an aperture formed on opposite ends of the cylindrical body; and
- wherein said boots each have an outer surface which lies in a plane perpendicular to an axis of the shaft, such that when the rotating body is placed within the pail, the outer surfaces each engage the inside surface of the pail in face to face contacting relation.

* * * * *